(12) United States Patent
Sakai et al.

(10) Patent No.: US 11,561,408 B2
(45) Date of Patent: Jan. 24, 2023

(54) STATE DETECTION DEVICE

(71) Applicant: DENSO CORPORATION, Kariya (JP)

(72) Inventors: Yosuke Sakai, Kariya (JP); Takuhiro Omi, Kariya (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 16/862,398

(22) Filed: Apr. 29, 2020

(65) Prior Publication Data

US 2020/0257128 A1 Aug. 13, 2020

Related U.S. Application Data

(63) Continuation of application No. PCT/JP2018/034417, filed on Sep. 18, 2018.

(30) Foreign Application Priority Data

Nov. 9, 2017 (JP) .............................. JP2017-216359

(51) Int. Cl.
*G01C 3/08* (2006.01)
*G02B 27/42* (2006.01)
*G01S 17/04* (2020.01)
*G01S 7/481* (2006.01)
*G02B 1/11* (2015.01)
*G02B 5/02* (2006.01)

(52) U.S. Cl.
CPC .......... *G02B 27/425* (2013.01); *G01S 7/4814* (2013.01); *G01S 17/04* (2020.01); *G02B 1/11* (2013.01); *G02B 5/0278* (2013.01)

(58) Field of Classification Search
CPC ...... G02B 27/425; G02B 5/02; G02B 5/0205; G02B 5/021; G02B 5/0215; G02B 5/0221; G02B 5/0226; G02B 5/0231; G02B 5/0236; G02B 5/0242; G02B 5/0247; G02B 5/0252; G02B 5/0257; G02B 5/0263; G02B 5/0273; G02B 5/0294; G02B 5/18; G02B 2005/1804; G02B 5/1814; G02B 5/1828; G02B 5/1866; G02B 1/11; G02B 5/0278; G02B 5/32; G02B 27/42; G02B 27/4233; G02B 27/4272; G02B 27/4277; G01C 3/00; G01C 3/02; G01C 3/08; G01S 17/04; G01S 7/4814; G01S 17/48; G01S 17/08; G01S 17/02
USPC ..... 359/1, 15, 558, 566, 569, 573, 574, 575, 359/576, 599; 356/4.01
See application file for complete search history.

(56) References Cited

U.S. PATENT DOCUMENTS

| 6,049,747 A | 4/2000 | Nakajima et al. |
| 7,350,945 B2 * | 4/2008 | Albou .................. G01S 17/931 |
| | | 362/543 |

(Continued)

FOREIGN PATENT DOCUMENTS

| CN | 201571139 U | 9/2010 |
| CN | 104488257 A | 4/2015 |

(Continued)

*Primary Examiner* — Arnel C Lavarias
(74) *Attorney, Agent, or Firm* — Harness, Dickey & Pierce, P.L.C.

(57) ABSTRACT

A state detection device includes a camera configured to capture an image of an imaging area where a driver is present, a laser configured to emit light toward the imaging area, and an optical member configured to emit the light of the laser with spreading to a predetermined irradiation area.

17 Claims, 19 Drawing Sheets

(56) References Cited

U.S. PATENT DOCUMENTS

| | | | |
|---|---|---|---|
| 7,622,728 B2 * | 11/2009 | Wuestefeld | G01S 7/497 356/239.8 |
| 8,724,858 B2 | 5/2014 | Kawakubo | |
| 2003/0214812 A1 * | 11/2003 | Bourdelais | G02B 5/0221 362/330 |
| 2008/0198335 A1 | 8/2008 | Kawai et al. | |
| 2008/0199165 A1 | 8/2008 | Ng et al. | |
| 2011/0123183 A1 | 5/2011 | Adelsberger et al. | |
| 2011/0210839 A1 | 9/2011 | Kawai et al. | |
| 2012/0188355 A1 | 7/2012 | Omi et al. | |
| 2015/0092118 A1 * | 4/2015 | Hada | H01S 5/02453 349/11 |
| 2015/0186737 A1 | 7/2015 | Omi et al. | |
| 2016/0148065 A1 | 5/2016 | Lee | |
| 2017/0082736 A1 * | 3/2017 | Hofmann | G01S 7/4814 |
| 2018/0259157 A1 | 9/2018 | Nishio et al. | |
| 2019/0024862 A1 | 1/2019 | Kurashige et al. | |

FOREIGN PATENT DOCUMENTS

| | | |
|---|---|---|
| CN | 105511086 A | 4/2016 |
| EP | 3348899 A1 | 7/2018 |
| JP | H10960 A | 1/1998 |
| JP | 2005235841 A | 9/2005 |
| JP | 2010164393 A | 7/2010 |
| JP | 4656070 B2 | 3/2011 |
| JP | 4888838 B2 | 2/2012 |
| JP | 2012156661 A | 8/2012 |
| JP | 2016049262 A | 4/2016 |
| JP | 2017097153 A | 6/2017 |
| JP | 201920647 A | 2/2019 |
| WO | WO-2017051868 A1 | 3/2017 |

* cited by examiner

STATE DETECTION DEVICE

CROSS REFERENCE TO RELATED APPLICATIONS

The present application is a continuation application of International Patent Application No. PCT/JP2018/034417 filed on Sep. 18, 2018, which designated the U.S. and claims the benefit of priority from Japanese Patent Application No. 2017-216359 filed on Nov. 9, 2017. The entire disclosures of all of the above applications are incorporated herein by reference.

TECHNICAL FIELD

The present disclosure relates to a state detection device.

BACKGROUND

Conventionally, there has been a state detection device that captures an image of a state of a vehicle interior or monitors a state of a driver.

SUMMARY

According to an aspect of the present disclosure, a state detection device includes a camera configured to capture an image of an imaging area where a driver is present, a laser configured to emit light toward the imaging area, and an optical member configured to emit the light of the laser with spreading to a predetermined irradiation area. The optical member may be further configured to control a light distribution of the light of the laser.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
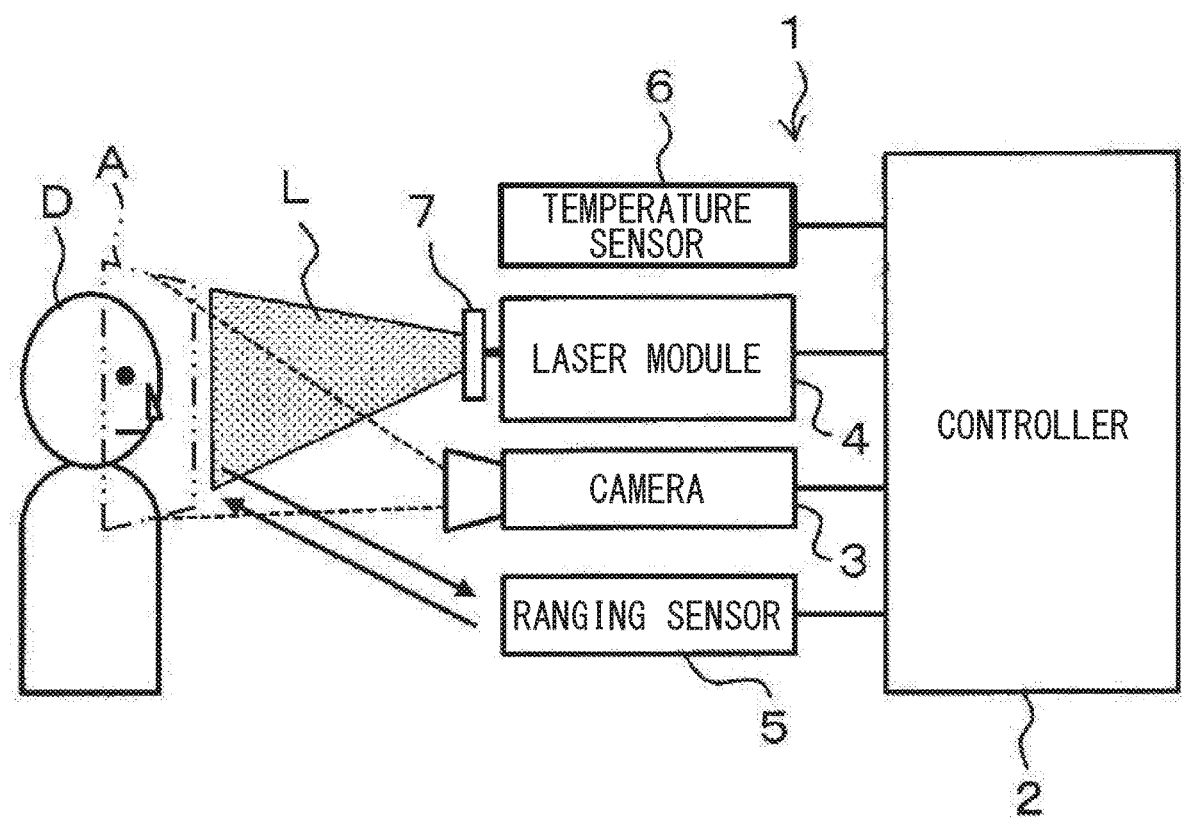
FIG. 1 is an electric block diagram showing a first embodiment.

As a device for detecting a state of a driver, there has been a device that captures an image of the driver with a camera provided in a vehicle and detects the state by image analysis or the like. In this case, for example, an LED (light emitting diode) may be used for lighting so that an image of the driver can be captured even at night. There has been a DSM (driver status monitor) that uses such technology.

In a vehicle, there is a difference in brightness between day and night, and an influence of disturbance light due to incident light such as reflected light. Therefore, stronger lighting is required in order to capture the image of the driver with certainty. Therefore, in order to realize strong lighting with the LED, it is conceivable to increase the number of LEDs or to increase a light emission intensity by increasing a current.

However, increasing the number of LEDs causes an issue that the size of the DSM device required to be mounted on the vehicle increases. In addition, increasing the current input to the LED, that is, increasing the electric energy causes increase in the power consumption of the vehicle, and in an electric vehicle, there is an issue that the travelable distance decreases due to the consumption of the electric energy.

In this case, as a highly efficient light source, there is, for example, a laser illumination. However, since a laser light has a locally high light intensity, it is necessary to ensure sufficient safety when using the laser light for irradiating a human body. In addition, there is an issue that it is difficult to efficiently illuminate an area where the driver is present.

According to a first aspect of the present disclosure, a state detection device includes a camera configured to capture an image of an imaging area where a driver is present, a laser configured to emit light toward the imaging area, and an optical member configured to emit the light of the laser with spreading to a predetermined irradiation area.

By employing the above configuration, it is possible to irradiate the driver with the laser light in a state where the light intensity is reduced to a light intensity that is safe for the human body by spreading the laser light to the range of the predetermined area via the optical member. As a result, it is possible to capture the image of the driver with the camera with irradiating the imaging area where the driver is present with a relatively strong light based on the laser light, and to recognize the state of the driver in a state where an influence of disturbance light is reduced.

First Embodiment

Hereinafter, a first embodiment applied to a driver state monitoring device provided in a vehicle will be described with reference to FIG. 1 to FIG. 12.

The driver state monitoring device 1 as a state detection device is provided in a vehicle interior of the vehicle, and is disposed to detect a state such as a facial expression and a motion of a driver D. The state detection device 1 is configured with the controller 2 as a control main body, and includes a camera 3, a laser module 4, a ranging sensor 5, and a temperature sensor 6.

The controller 2 includes a CPU, a memory, and an input-output circuit, for example, and executes a state monitoring process according to a program. In the present embodiment, a process of monitoring a driver state based on image information from the camera 3 is similar to a process of a general driver state monitoring device, and a description thereof will be omitted.

The camera 3 is disposed toward a driver seat, and captures an image of a range of an imaging area A including a face of the driver D, and outputs image information to the controller 2. The laser module 4 includes, for example, a semiconductor laser that outputs an infrared laser light, and outputs a laser light in accordance with a projection signal from the controller 2. In the laser module 4, a rectangular diffusion plate 7 as an optical member is disposed on a surface portion of a portion that emits the laser light.

The diffusion plate 7 has a relatively small thickness, is formed in a plate shape or a film shape, and contains a material for scattering the laser light. When the coherent and converged laser light emitted from the laser module 4 is transmitted through the diffusion plate 7, the diffusion plate 7 emits the laser light as a diffused light L diffused and spread in a rectangular irradiation pattern to the imaging area A that is a predetermined irradiation area. Then, the diffused light L is set so as to be emitted at substantially the same shape and the same size at a position of the imaging area A of the camera 3.

The ranging sensor 5 as a distance detector detects a distance to the driver D present in the imaging area A, and outputs a distance detection signal to the controller 2.

The temperature sensor 6 as a temperature detector detects a temperature in the vicinity of the laser module 4, and outputs a temperature detection signal to the controller 2. The controller 2 controls the operations of the camera 3 and the laser module 4 to detect the state of the driver D in the imaging area A as described later. Further, the controller 2 controls the operation of the laser module 4 based on the detection signals from the ranging sensor 5 and the temperature sensor 6.

Figure 2:
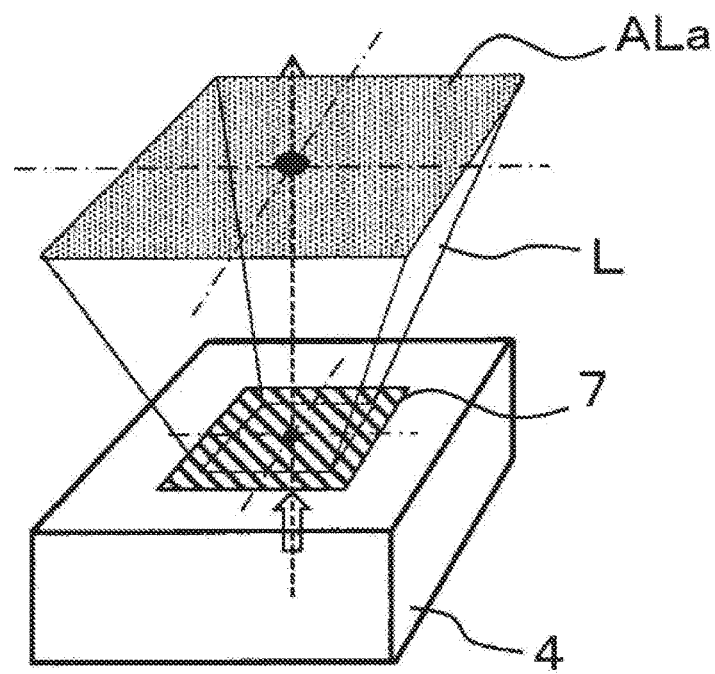
FIG. 2 is a diagram showing a laser module and a light emitting area.
Figure 3:
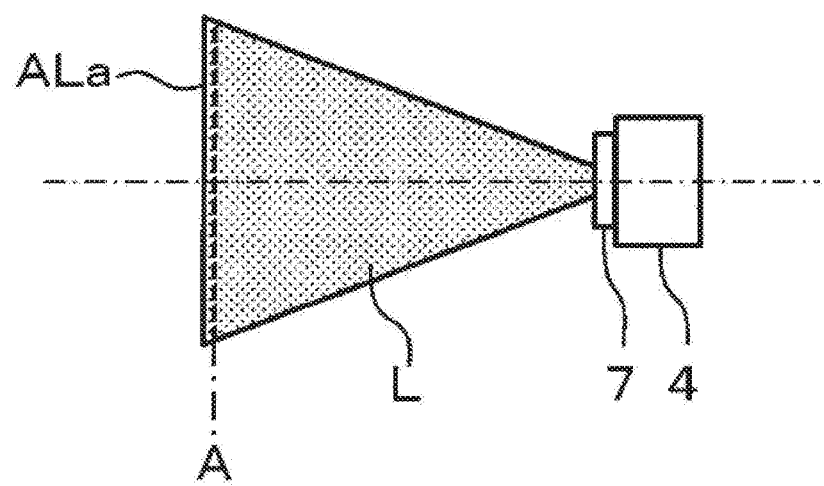
FIG. 3 is a diagram showing an arrangement relationship between the laser module and a diffusion plate.

FIG. 2 and FIG. 3 schematically show the arrangement of the laser module 4. As shown in FIG. 2, the laser module 4 emits the coherent infrared laser light from a center portion of an upper surface toward the diffusion plate 7 disposed above by energization from the controller 2. The laser light itself is emitted as a light focused to a center point position. However, the rectangular diffusion plate 7 provided on the upper surface emits the laser light as the diffused light L that is controlled to be spread into the rectangular shape. The diffused light L is emitted to an area ALa that is rectangular and substantially coincides with the imaging area A.

Figure 4:
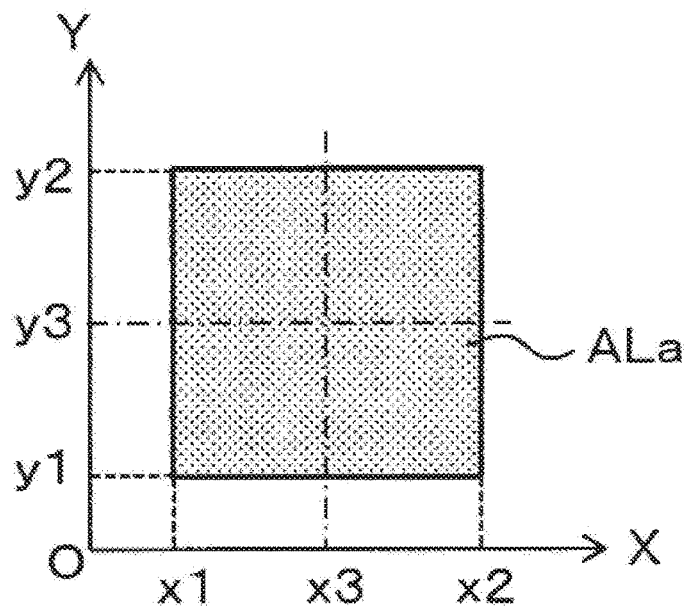
FIG. 4 is a diagram showing a two-dimensional area of a diffused laser light.

FIG. 4 shows the area ALa when the diffused light L of the laser light is emitted toward the imaging area A. The laser light is scattered when passing through the diffusion plate 7 and is output as light that is spread to the rectangular irradiation area ALa substantially equal to the imaging area A as shown in FIG. 4. In this case, the irradiation area ALa is set so that the coordinates in the x direction (horizontal direction) are between x1 and x2, and the coordinates in the y direction (vertical direction) are between y1 and y2. The coordinates (x3, y3) are a center position of the irradiation area ALa.

Figure 5:
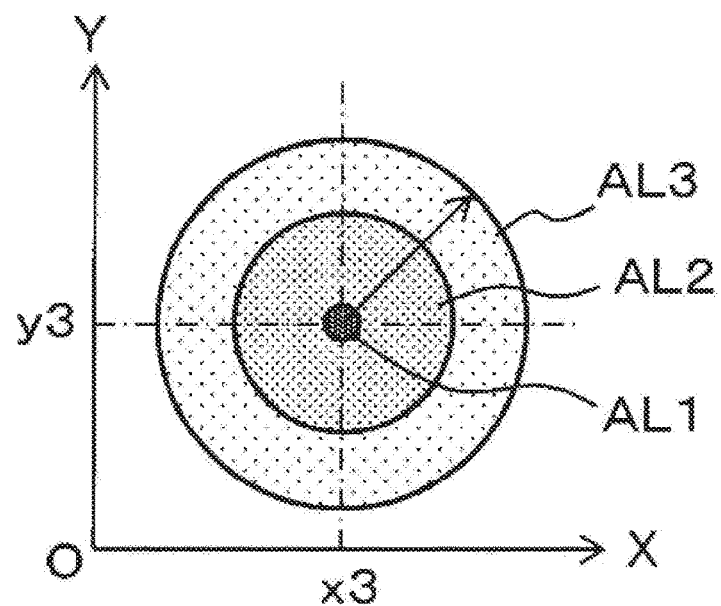
FIG. 5 is a diagram showing a two-dimensional area of the laser light.

In this case, as shown in FIG. 5, when the diffusion plate 7 is not provided, the laser light emitted from the laser module 4 irradiates a center position indicated by the coordinates (x3, y3) with strong light. Then, an area with weak light intensity is formed concentrically around the center position. The irradiation intensity distribution of the laser light at this time has, for example, a pattern shown by a broken line in FIG. 6.

Figure 6:
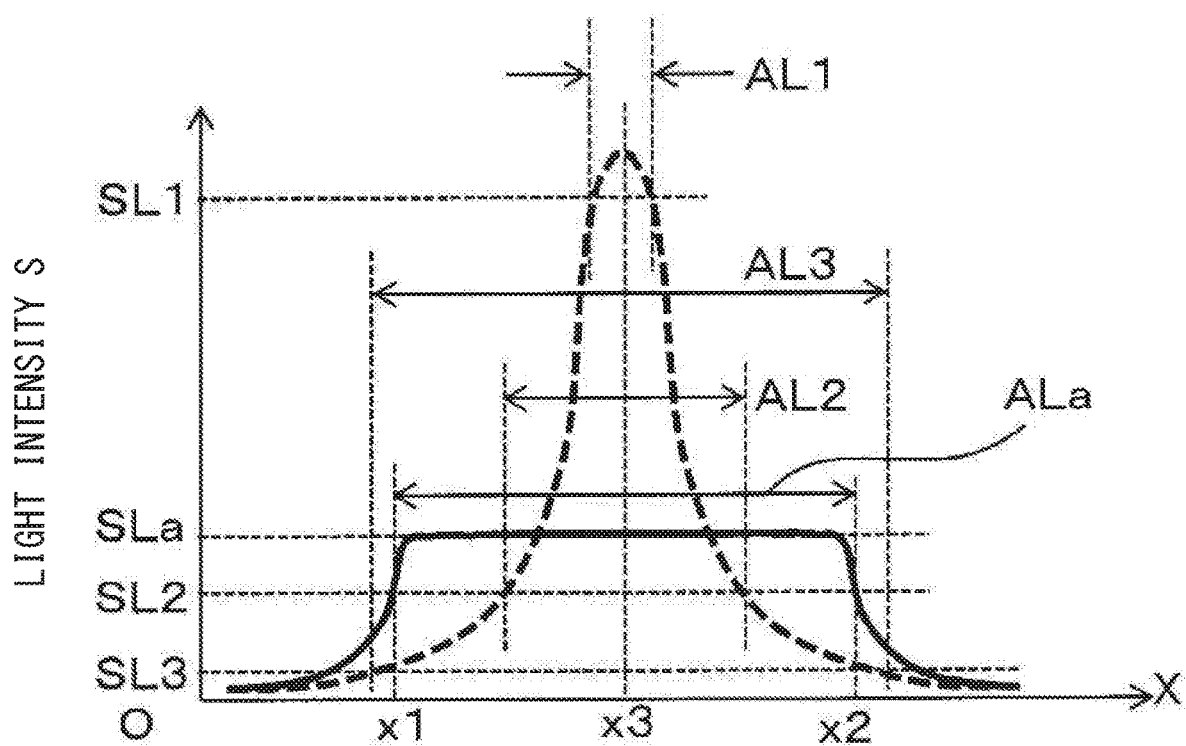
FIG. 6 is a diagram showing a light intensity distribution of the laser light.
Figure 7:
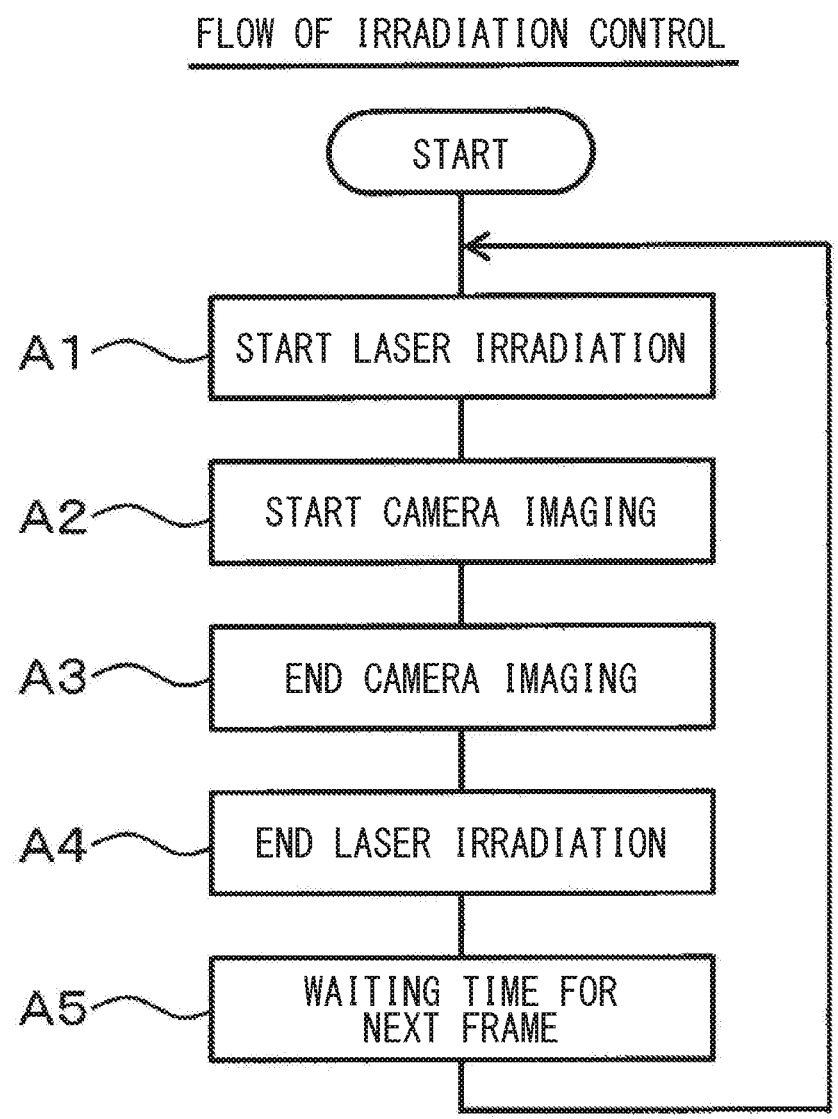
FIG. 7 is a flowchart of a laser light irradiation control.

That is, the irradiation intensity S of the laser light is the strongest at the center position (x3, y3), and rapidly decreases concentrically with decrease in distance to a periphery. As shown in FIG. 6, the irradiation intensity in an area AL1 including the strongest center position is SL1 or greater, the irradiation intensity in an outer area AL2 is SL2 or greater, and the irradiation intensity of a further outer area AL3 is SL3 or greater.

On the other hand, by disposing the diffusion plate 7, the laser light entering the center position of the coordinates (x3, y3) is scattered when passing through the diffusion plate 7 and is output as light spread to the rectangular irradiation area ALa. In this case, the irradiation area ALa is set so that the coordinates in the x direction are spread between x1 and x2 and the coordinates in the y direction are spread between y1 and y2, with the coordinates (x3, y3) as the center. In this irradiation area, the laser light is diffused such that the irradiation intensity is distributed uniformly. Therefore, as shown by the solid line in FIG. 6, the irradiation intensity has a flat distribution within the area ALa.

As a result, by setting the irradiation area ALa so as to coincide with the imaging area A to be imaged by the camera 3, the infrared laser light can be emitted from the laser module 4 to the imaging area A with uniform irradiation intensity as the diffused light L.

Since the laser light output from the laser module 4 is infrared light, but the light intensity is high, the laser light is spread by the diffusion plate 7 so that the light intensity is reduced to a uniform and safe light intensity. However, since the diffused light L is emitted toward the face of the driver, safety measures are taken as described later so as not to increase the intensity of light particularly entering eyes.

Next, an operation of the controller 2 for imaging the driver D in the imaging area A will be described with reference to FIG. 4 to FIG. 12. The controller 2 performs an irradiation control by repeatedly executing a flow control shown in FIG. 7. In step A1, the controller 2 outputs a laser light irradiation start signal to the laser module 4 so as to output the laser light. Accordingly, the laser light passes through the diffusion plate 7 and is emitted as the diffused light L toward the imaging area A.

After that, in step A2, the controller 2 outputs an imaging start signal to the camera 3. The camera 3 captures an image of the driver D in the imaging area A irradiated with the diffused light L and transmits the captured image to the controller 2. When the controller 2 acquires the image captured by the camera 3, the controller 2 outputs an imaging end signal to the camera 3.

After that, in step A4, the controller 2 outputs a laser irradiation end signal to the laser module 4. After that, in step 5, the controller 2 waits until the start of the next frame, and returns to step A1 again to repeatedly perform the laser light irradiation and the imaging operation by the camera 3.

Figure 8:
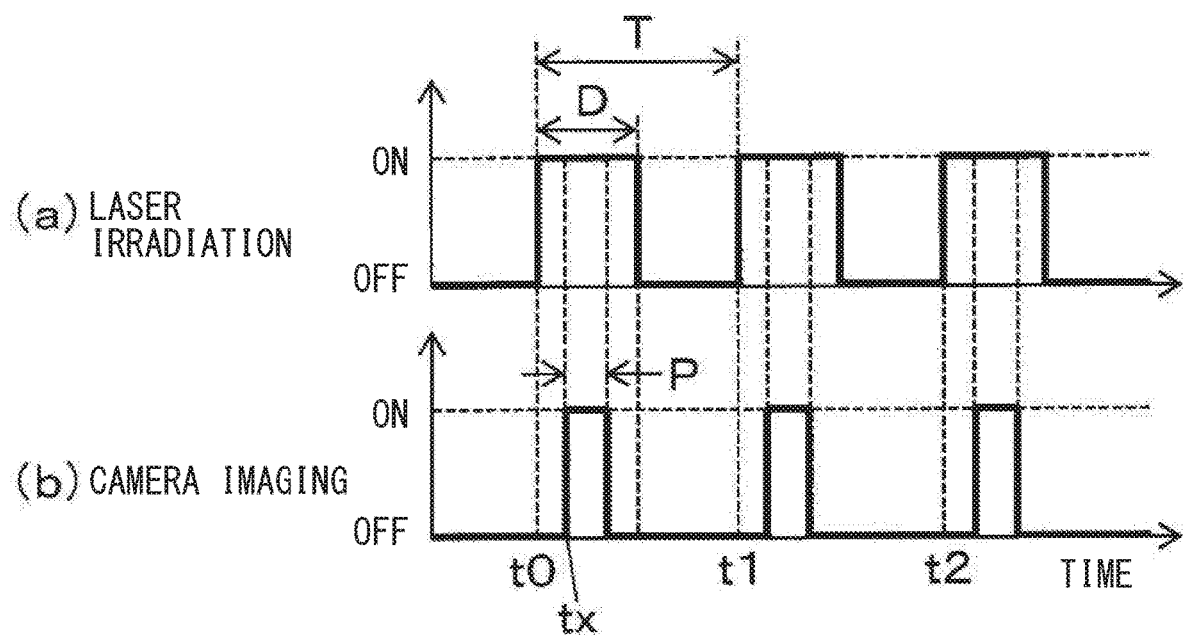
FIG. 8 is a timing chart of a laser irradiation and a camera imaging.

As shown in (a) of FIG. 8, the operation of the controller 2 performs the irradiation of the laser light by the laser module 4 during a time of a duty D in a repetition period T. Then, as shown in (b) of FIG. 8, the imaging by the camera 3 is performed during a time P in the period of the duty D during which the laser light is emitted. As a result, the laser light is intermittently emitted, and the camera 3 can perform the imaging operation during the period. By intermittently emitting the laser light, heat generation of the laser module 4 and a decrease in light emission due to the heat generation can be prevented.

In the irradiation of the imaging area A with the laser light, in a case where a required light amount is large, the duty D can be set to be longer as appropriate, or the duty D can be set to 100%, that is, continuous irradiation can be performed instead of the intermittent irradiation as described above.

In the imaging operation as described above, the controller 2 can prevent the laser light from affecting the human body and can reduce the power consumption by restricting the emission of an excessive amount of light. That is, as shown in FIG. 9 and FIG. 10, the controller 2 performs a dimming control 1 and a dimming control 2 in the emission of the laser light by the laser module 4.

Figure 9:
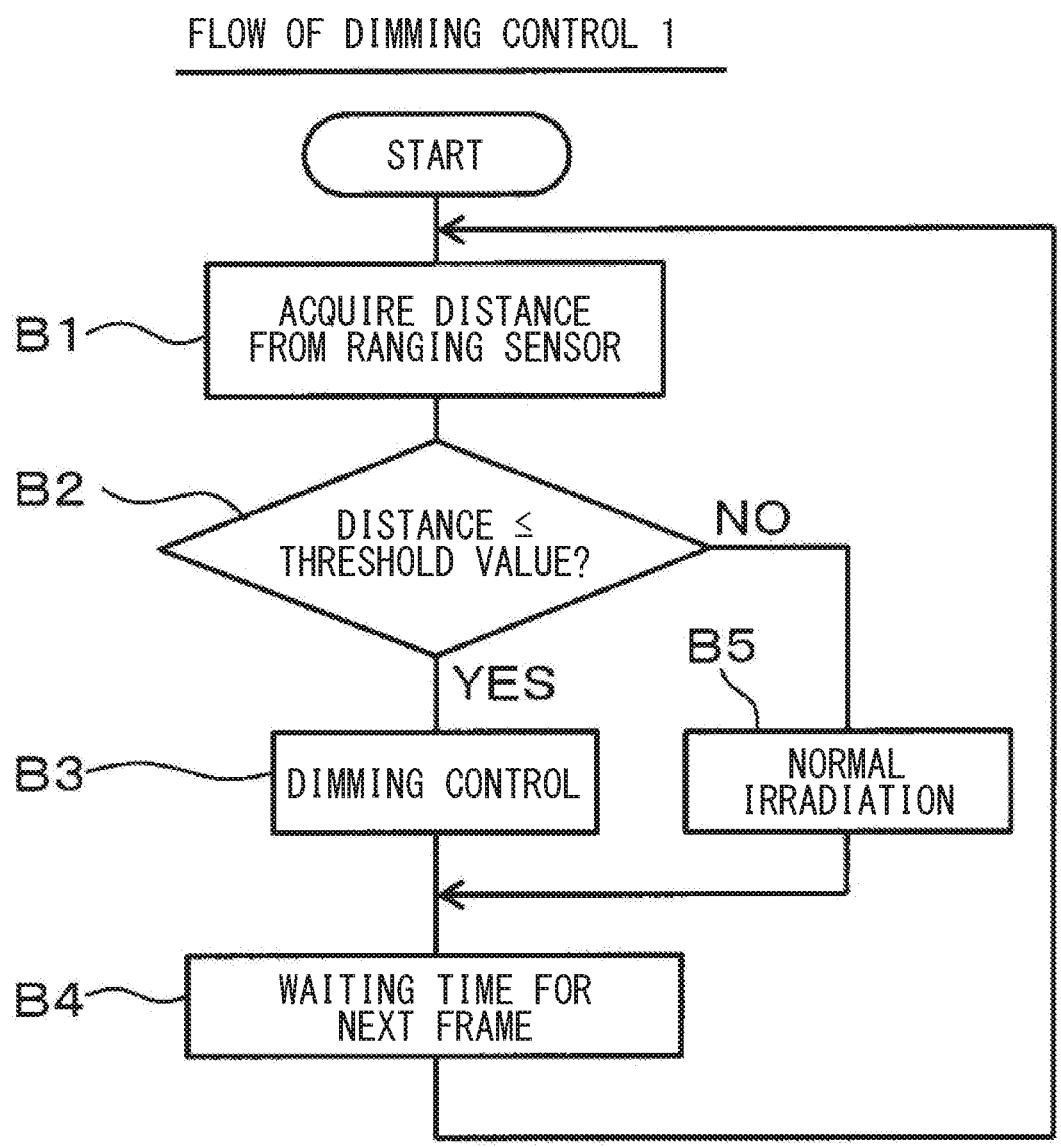
FIG. 9 is a flowchart (part 1) of a dimming control.
Figure 10:
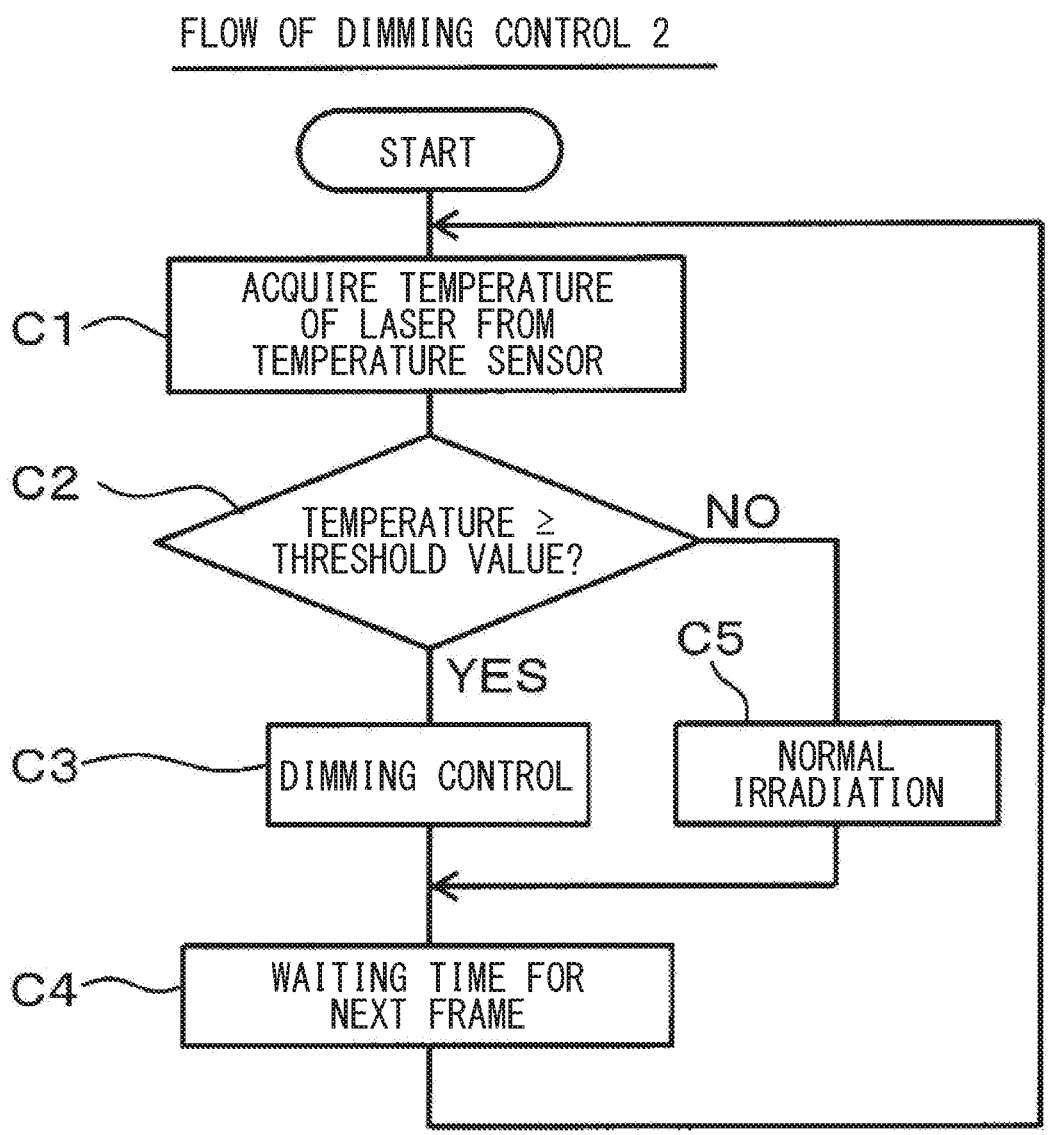
FIG. 10 is a flowchart (part 2) of the dimming control.

As the dimming control 1, the controller 2 performs a dimming control based on the detection signal from the ranging sensor 5, as shown in FIG. 9. In step B1, the controller 2 acquires the distance from the laser module 4 to the driver D, which is an imaging target in the imaging area A, from the detection signal from the ranging sensor 5. In step B2, the controller 2 determines whether the value of the detected distance is equal to or less than a threshold value.

If the detected distance exceeds the threshold value and the result of step B2 is YES, in step B3, the controller 2 executes the dimming control so as to reduce the light amount of the laser module 4. After that, in step B4, when a waiting time until the next frame elapses, the controller 2 returns to step B1 again and repeats the above process.

If NO in step B2, the controller 2 proceeds to step B5 and performs the normal irradiation control by the laser module 4.

As described above, when it is detected that the face of the driver D is closer to the position of the laser module 4 than the threshold distance, the controller 2 executes the dimming control to reduce the light amount of the laser light of the laser module 4 so as to restrict the face of the human body from being irradiated with the strong diffused light L from a close distance.

Next, as a dimming control 2, the controller 2 performs a dimming control based on the detection signal from the temperature sensor 6, as shown in FIG. 10. In step C1, the controller 2 acquires the temperature detected by the temperature sensor 6 disposed in the vicinity of the laser module 4 as the temperature of the laser module 4. In step C2, the controller 2 determines whether the detected temperature is equal to or higher than a threshold value.

If the detected temperature is equal to or higher than the threshold value and the result of step C2 is YES, in step C3, the controller 2 executes the dimming control so as to reduce the light amount of the laser module 4. After that, in step C4, when a waiting time until the next frame elapses, the controller 2 returns to step C1 again and repeats the above process. If NO in step C2, the controller 2 proceeds to step B5 and performs the normal irradiation control by the laser module 4.

As described above, when the temperature of the laser module 4 is equal to or higher than the threshold value, the dimming control is executed to reduce the amount of laser light of the laser module 4 so as to reduce the amount of heat generation in order to avoid an increase in temperature due to insufficient heat radiation. Thus, the amount of heat generation is restricted by reducing the input power, and the temperature is reduced due to heat radiation.

Figure 11:
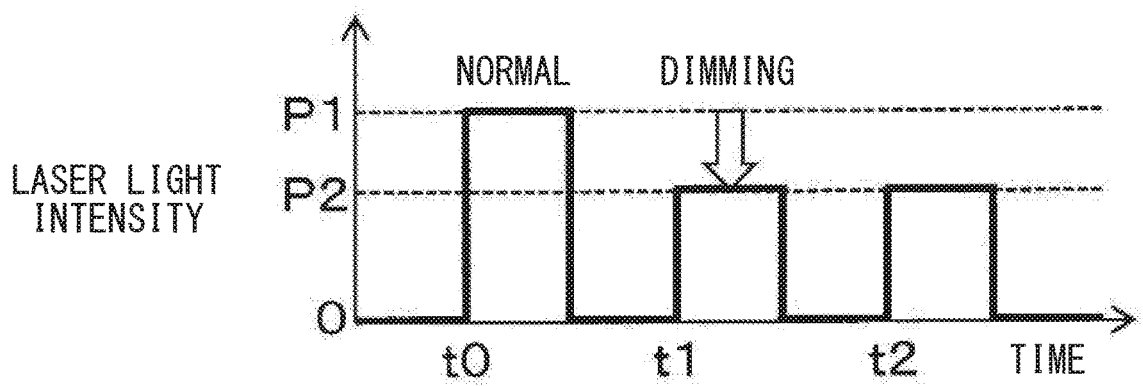
FIG. 11 is a timing chart (part 1) showing a change control of a laser light intensity.

Next, as specific methods of the dimming control of the laser module 4 described above, the following two examples will be described. FIG. 11 shows a first method in which the irradiation intensity of the laser light output from the laser module 4 is reduced by the controller 2. For example, assuming that the irradiation intensity of the laser light before being dimmed is P1, in the dimming control, the input power is reduced by reducing the current applied to the laser module 4 by the controller 2, and the irradiation intensity of the laser light is changed to P2 lower than P1 accordingly.

Figure 12:
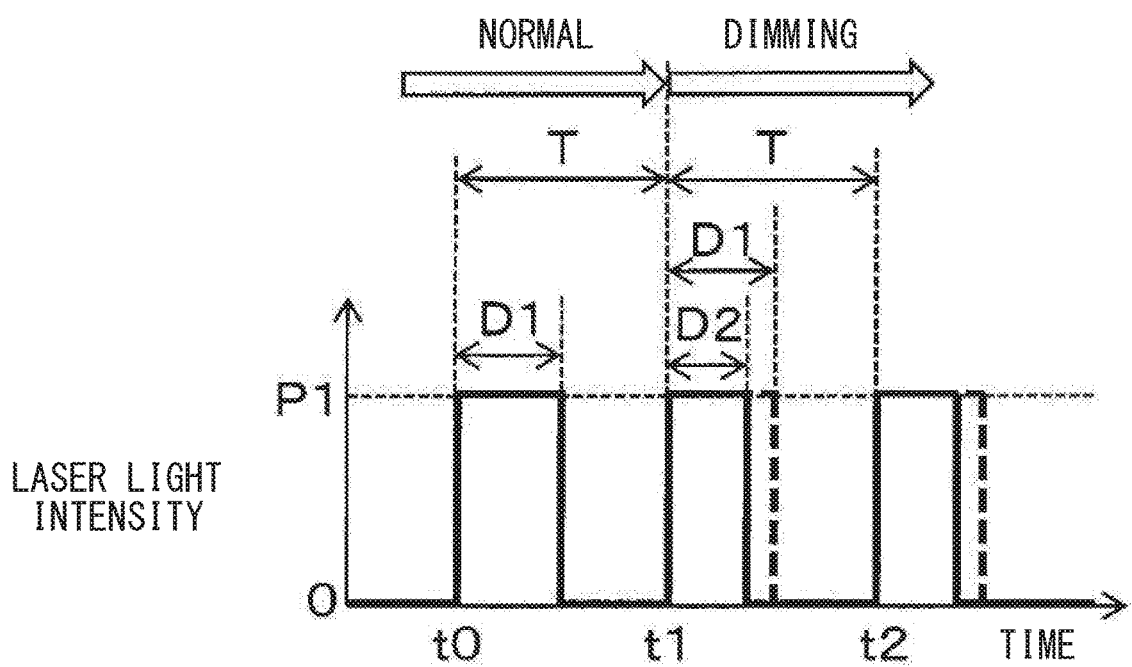
FIG. 12 is a timing chart (part 2) showing a change control of the laser light intensity.

FIG. 12 shows a second method in which the irradiation time of the laser light output from the laser module 4 is shorten by the controller 2. For example, assuming that the duty of the laser light before being dimmed is D1, in the dimming control, the controller 2 shortens the duty of the laser module 4 to D2 (<D1) to shorten the light emission period, thereby dimming the light.

According to the first embodiment, since the infrared laser light output from the laser module 4 is applied to the imaging area A of the camera 3 by the diffusion plate 7 as the rectangular diffused light L, the laser light can be emitted with controlling the light distribution so as to spread uniformly over the imaging area A without irradiating an extra area, and thus the laser light can be used efficiently as illumination. Further, since the diffusion plate 7 as the optical member is in the form of a plate or a film, the whole structure can be made compact.

According to the above-described embodiment, the laser light output from the laser module 4 is intermittently turned on by the controller 2 and the camera 3 captures the image during the turn-on period. Thus, power saving and heat generation restriction can be achieved as compared with a case where the laser light is irradiated all the time.

Further, with the use of the ranging sensor 5, when the distance to the driver D in the irradiation area becomes less than the predetermined distance, the controller 2 reduces the light amount of the laser light emitted from the laser module 4. Thus, in a case where the diffused laser light is emitted within a safe distance, it is possible to prevent the human body from being adversely affected.

Similarly, the temperature in the vicinity of the laser module 4 is detected by using the temperature sensor 6, and when the temperature reaches a certain level or more, the controller 2 reduces the amount of the laser light emitted from the laser module 4. Therefore, it is possible to prevent the temperature of the laser module 4 from increasing excessively and to prevent the deterioration such as shortening of the service life.

In the above-described embodiment, the case in which the diffusion plate 7 is used as the optical member has been described. However, as the optical member, a diffraction grating that diffracts and spreads a laser light may also be used.

Further, in the above-described embodiment, the configuration in which the diffusion plate 7 is provided so as to be in contact with the laser light emission surface of the laser module 4 has been described. However, the present disclosure is not limited to this configuration and may also have a configuration in which the diffusion plate 7 is provided at a position separated from the laser light emission surface.

Further, in the above-described embodiment, the irradiation area ALa of the diffused light L of the laser light is made substantially coincident with the imaging area A of the camera 3, but the irradiation area ALa may also be set to be larger than the imaging area A.

Second Embodiment

FIG. 13 to FIG. 16 show the second embodiment, and hereinafter, portions different from the first embodiment will be described. The present embodiment has a configuration in which a diffusion plate 10 is used instead of the diffusion plate 7 as the optical member. Hereinafter, a characteristic of the diffusion plate 10 will be described.

Figure 13:
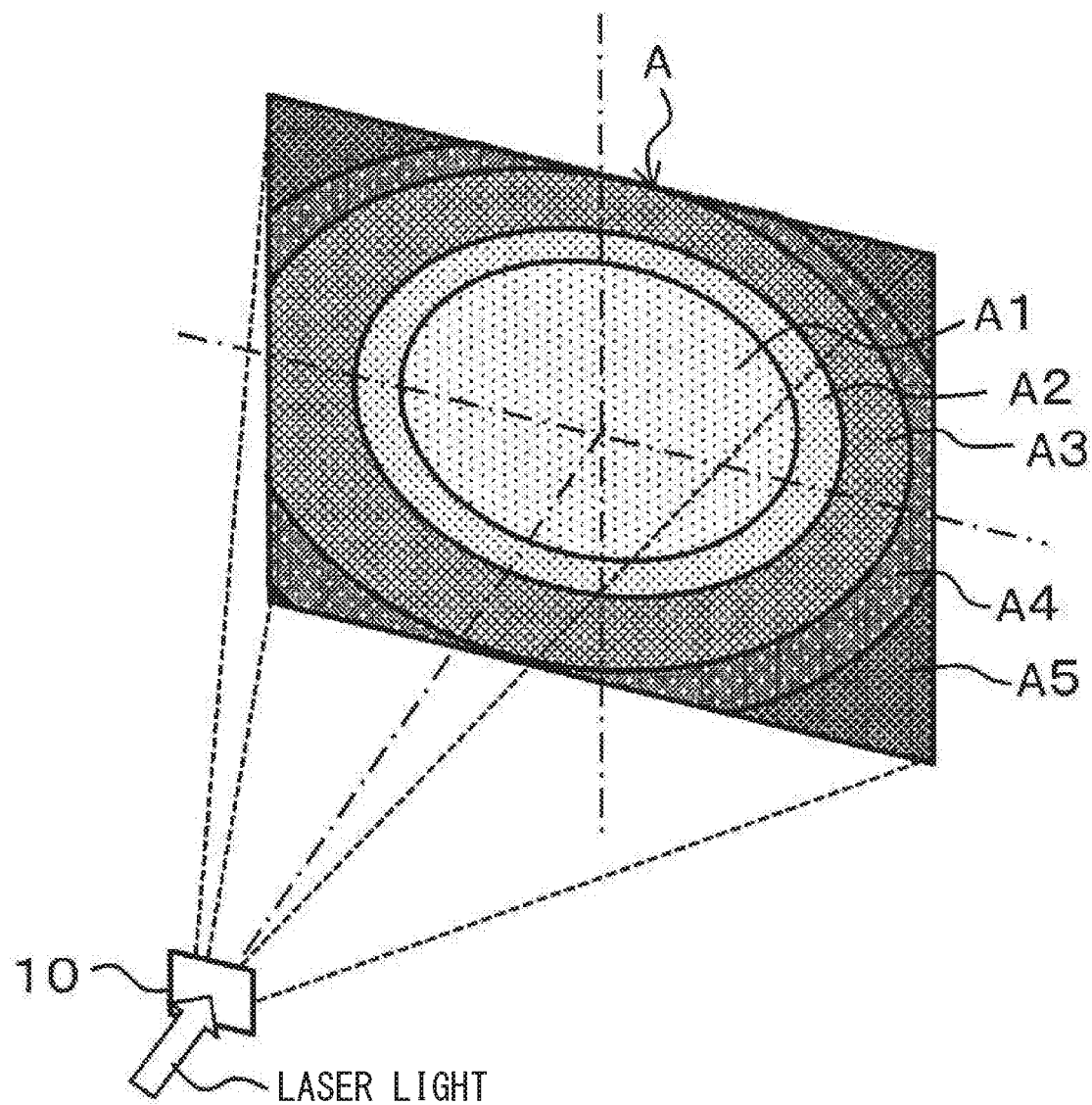
FIG. 13 is a diagram of a laser module and a light emitting area according to a second embodiment.

When transmitting the laser light from the laser module 4, the diffusion plate 10 controls the light distribution so that the amount of the laser light differs depending on the area, as shown in FIG. 13. In the present embodiment, for example, when assuming concentric areas A1 to A5 from the center in the imaging area A, the diffusion plate 10 controls the light distribution so that the amount of diffused light L is minimized in the area A1, and the light amount is increased toward an outer periphery from the area A2 to the area A5. In FIG. 13, the area A5 where the light amount is set to be large is indicated by a dark fill pattern.

Figure 15:
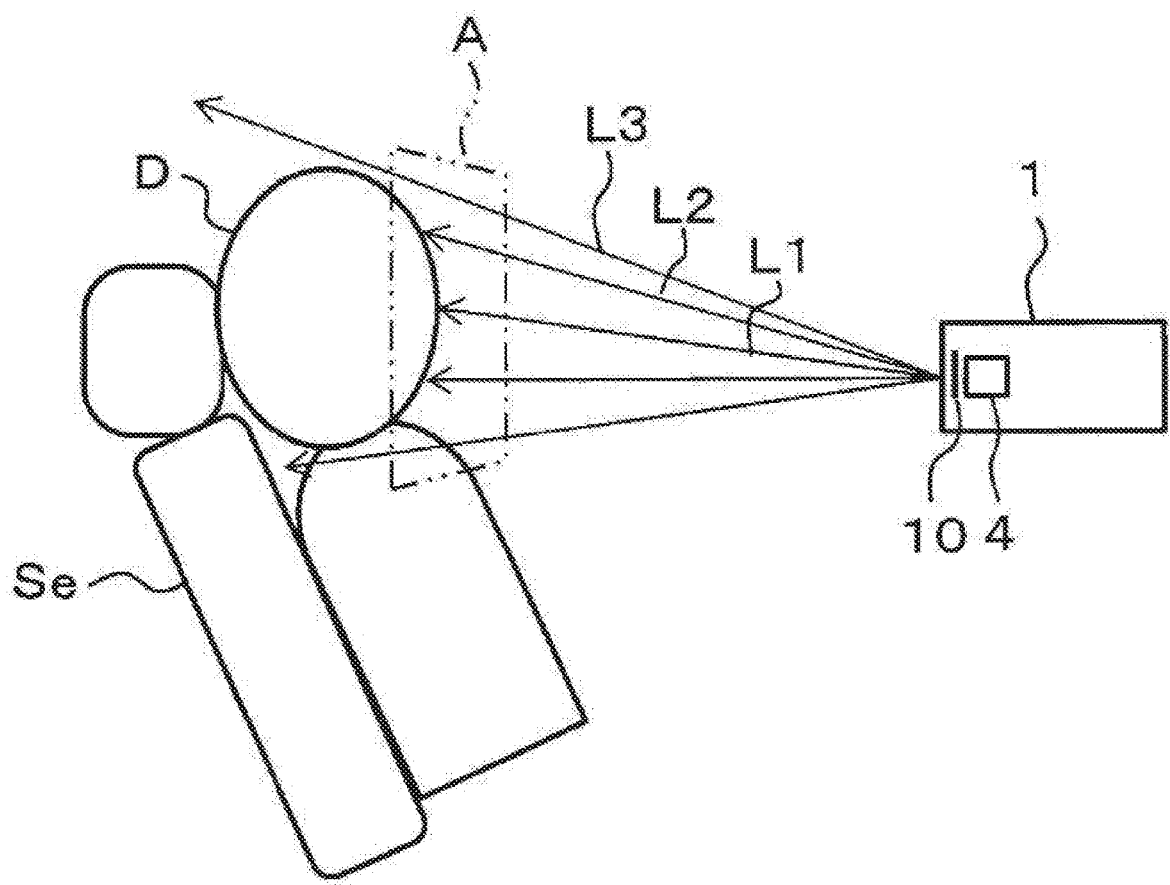
FIG. 15 is a diagram showing a distance from the laser module to each part of a driver in the imaging area.

Next, the reason why the light distribution characteristic of the diffusion plate 10 is set as described above will be described. In the present embodiment, the laser light emitted from the laser module 4 is projected through the diffusion plate 10 toward a driver D on a driver seat Se. At this time, as shown in FIG. 15, a distance L1 from the laser module 4 is short in an area centered on the face of the driver D, and the distance slightly increases to L2 as separating from the center of the face. Then, at a position outside the face, the distance is L3 far from the laser module 4.

Figure 16:
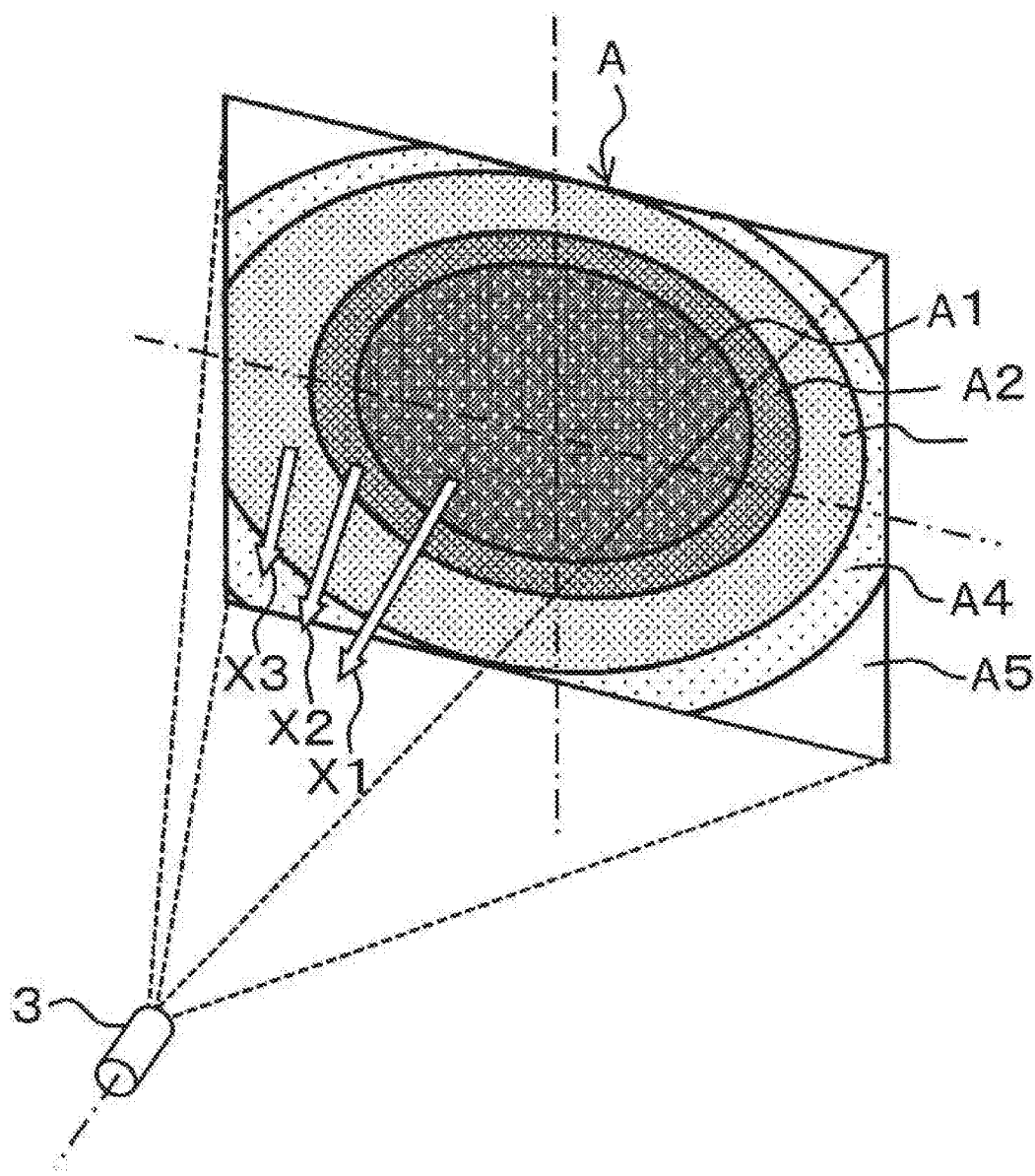
FIG. 16 is a diagram showing the light intensity of the reflected light when light having a uniform light intensity is projected onto the imaging area.

As described above, when the distance from the laser module 4 changes as L1 to L3, the intensity of light reflected from that position is inversely proportional to the square of the distance, so that the reflected light from a far position has a lower light intensity. For this reason, as shown in FIG. 16, in a case where the light of the laser module 4 is diffused with uniform light intensity, the intensity X1 of the reflected light from the area A1 of a short distance L1 is large, and with increase in the distance X to L2 and L3 toward the outer periphery, the intensities X2 and X3 of the reflected light from the areas A2 and A3 decrease in inverse proportion to the square of the distance.

Thus, when the camera 3 captures an image of the imaging area A, if the laser module 4 emits the diffused light L toward the imaging area A with uniform irradiation intensity, the light in the area A1 of a short distance L1 is strong, and the light intensity gradually decreases outward to the surrounding areas A2, A3. As a result, in the image capturing by the camera 3, the light is strong in the image of the face area A1 of the driver D, and the light is weak in the surrounding areas A2 and A3. Therefore, when performing an image recognition processing, the resolution may be reduced because a difference in brightness becomes large.

Figure 14:
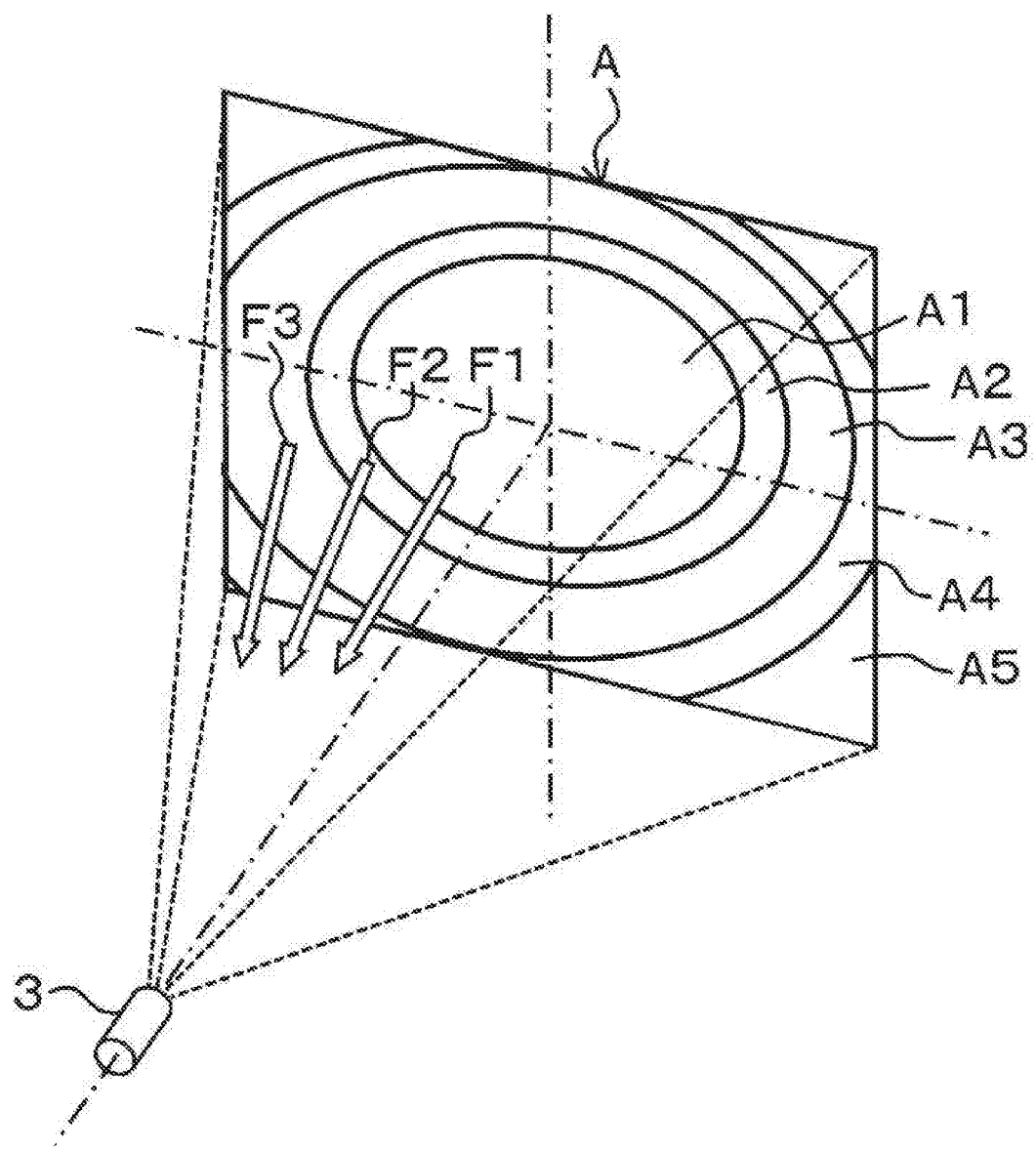
FIG. 14 is a diagram showing the intensity of a reflected light from an imaging area.

Assuming such a state, in the present embodiment, the light distribution control as shown in FIG. 13 is performed by the distribution plate 10. Accordingly, as shown in FIG. 14, the reflected light from the areas A1 to A5 of different distances can be made to enter the camera 3 with substantially uniform light intensities F1, F2, and F3. Therefore, the image processing of the captured image can be performed based on the reflected light having substantially uniform light intensity in the imaging area A.

According to the second embodiment, the diffusing plate 10 is used to reduce the degree of diffusion of the laser light from the laser module 4 to a short distance area and increase the diffusion degree to a long distance area. Thus, the light can be received from the imaging region A in a balanced state, and a decrease in resolution of information of the image used for an image analysis can be restricted.

Third Embodiment

FIG. 17 to FIG. 20 show a third embodiment, and portions different from the first embodiment will be described below. In the present embodiment, a diffraction grating 8 as an optical member is provided on an irradiation path of the laser light in addition to the diffusion plate 7.

Figure 17:
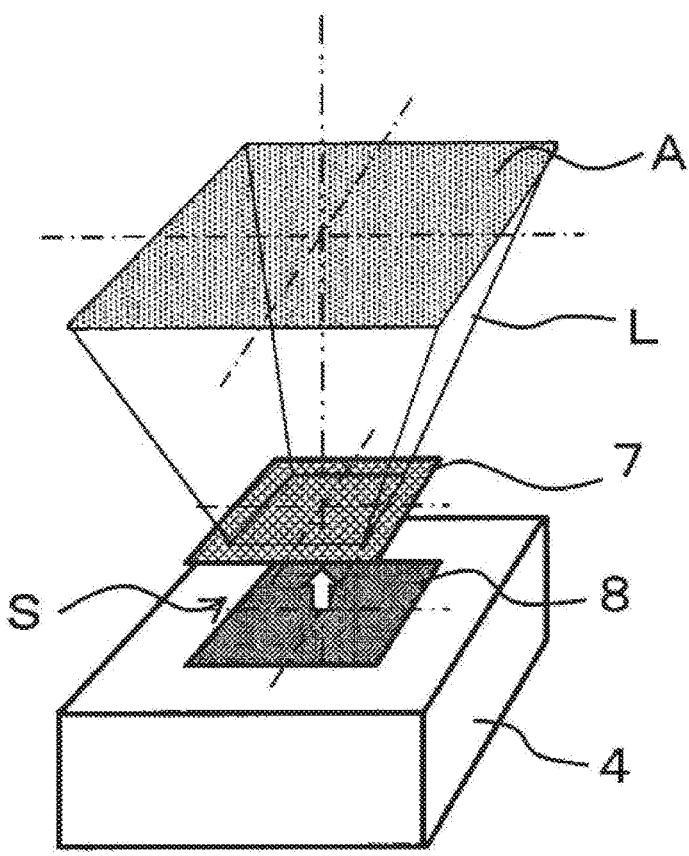
FIG. 17 is a diagram showing a laser chip and a light emitting area according to a third embodiment.
Figure 18:
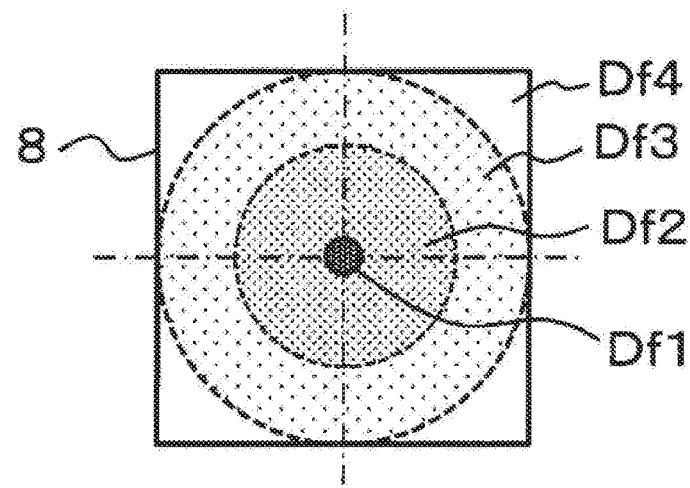
FIG. 18 is a diagram showing a setting example of a scattering coefficient of a diffraction grating.

In the present case, as shown in FIG. 17, the diffraction grating 8 is disposed between the laser module 4 and the diffusion plate 7, and the diffusion plate 7 is separated from the laser module 4 via a space portion S as an air layer. As shown in FIG. 18, the diffraction grating 8 is set so that a scattering coefficient Df differs in a plane.

In the present embodiment, as shown in FIG. 18, a large scattering coefficient Df1 is set in an area of the center position from which the laser light is emitted, and with increase in the radius concentrically from the center position, scattering coefficients Df2, Df3, and Df4 are set to become smaller in order so as to satisfy the following inequality (1). Note that, in FIG. 17, an area where the scattering coefficient is large is indicated by a dark fill pattern.

$$Df1 > Df2 > Df3 > Df4 \tag{1}$$

Accordingly, the laser light entering from the laser module 4 is strongly scattered and spread at the central portion, and is scattered so as to reduce the degree of scattering at the outer peripheral portion where the light intensity of the laser light is weak. As a result, in the portion emitted from the diffraction grating 8, the laser light is weakened at the central portion and enters the diffusion plate 7 as the spread light. In the diffusion plate 7, the laser light is further diffused, so that the imaging area A is irradiated with the diffused light L with substantially uniform irradiation intensity.

Figure 19:
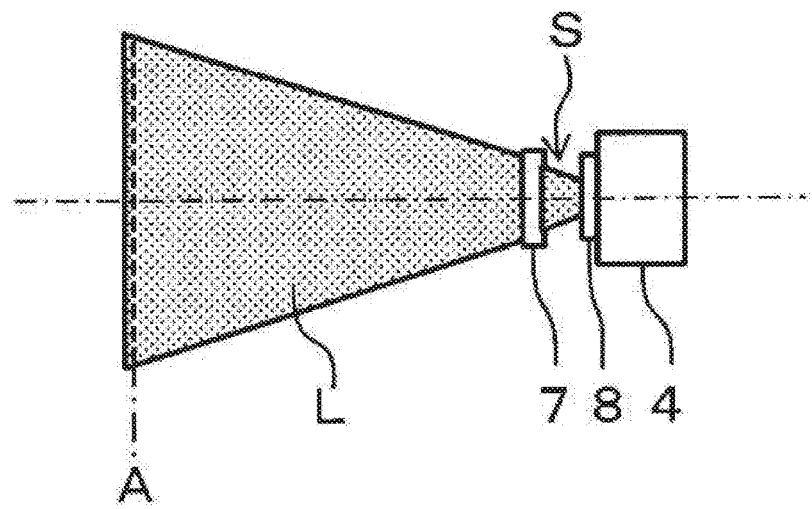
FIG. 19 is a diagram (part 1) showing an arrangement relationship between the laser module, the diffusion plate, and the diffraction grating.

FIG. 19 shows an arrangement state of the diffusion plate 7 and the diffraction grating 8 with respect to the laser module 4. In the present case, the diffraction grating 8 is disposed in a state of being in contact with the laser light emission surface of the laser module 4. The diffusion plate 7 is disposed at a position separated via the space portion S.

Accordingly, the imaging area A of the camera 3 can be irradiated with the diffused light L with uniform irradiation intensity.

Since the light that is spread by diffracting the laser light by the diffraction grating 8 enters the diffusion plate 7, the laser light can enter the diffusion plate 7 in a further expanded state when the space portion S is provided between the diffusion plate 7 and the diffraction grating 8. Further, when the space portion S is provided, the heat radiation effect of the heat transmitted from the laser module 4 to the optical member can be increased as compared with a case where both are disposed so as to be in contact with the laser light emission surface of the laser module 4.

When the light distribution control as described in the second embodiment is performed as the characteristics of the diffusion plate 7, the reflected light from the imaging area A can enter the camera 3 at a light intensity independent of the distance to the camera 3.

Figure 20:
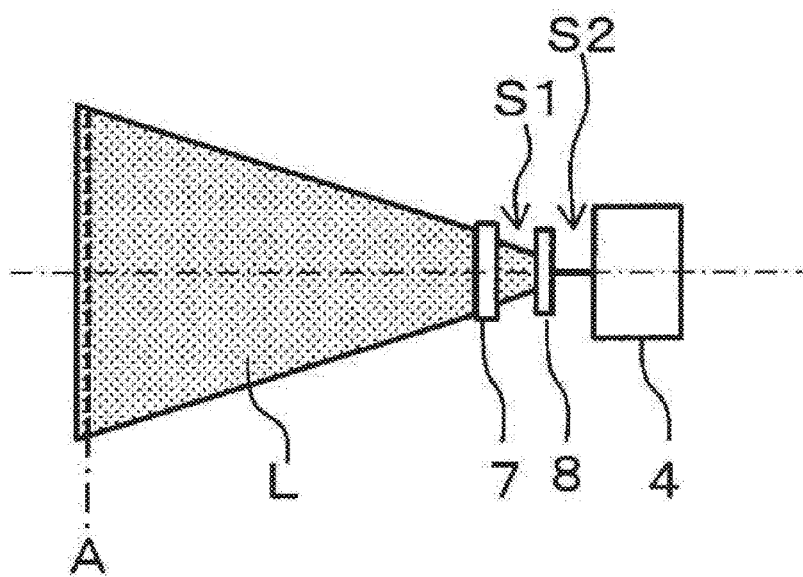
FIG. 20 is a diagram (part 2) showing an arrangement relationship between the laser module, the diffusion plate, and the diffraction grating.

FIG. 20 similarly shows an arrangement state of the diffusion plate 7 and the diffraction grating 8 with respect to the laser module 4. In the present case, the diffraction grating 8 is also separated from the laser light emission surface of the laser module 4. That is, the diffusing plate 7 and the diffraction grating 8 are separated from each other with a space portion S1 therebetween, and the diffraction grating 8 and the laser light emission surface of the laser module 4 are separated from each other with a space portion S2 therebetween.

According to the third embodiment, since the diffraction grating 8 that scatters laser light is provided in addition to the diffusion plate 7, the laser light of the laser module 4 can be projected onto the imaging area A in a more uniform state. Further, since the diffusion plate 7 and the diffraction grating 8 are disposed in a state of being separated from the laser module 4, the heat of the laser module 4, the diffusion plate 7, and the diffraction grating 8 can be more likely to be released in the space portion S or the space portions S1 and S2.

It should be noted that the positional relationship between the diffusion plate 7 and the diffraction grating 8 can be switched. In addition, the diffusion plate 7 and the diffraction grating 8 are not limited to the case of providing one by one, and an appropriate number can be used in combination, and an appropriate arrangement can be applied.

Fourth Embodiment

Figure 21:
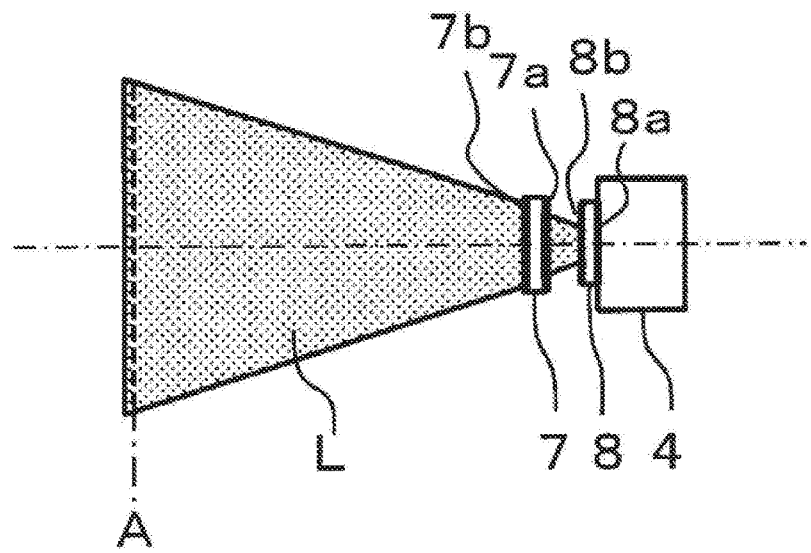
FIG. 21 is a diagram (part 1) showing an arrangement relationship between a laser module, a diffusion plate, and a diffraction grating according to a fourth embodiment.
Figure 22:
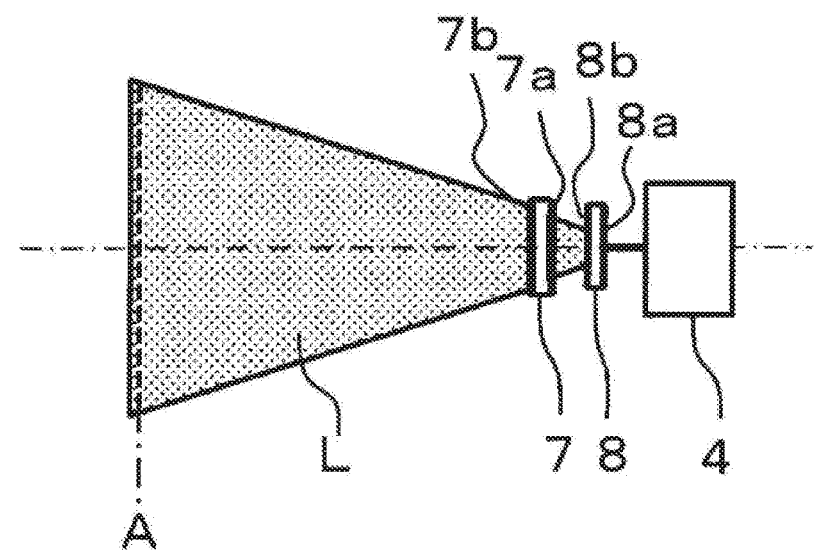
FIG. 22 is a diagram (part 2) showing an arrangement relationship between the laser module, the diffusion plate, and the diffraction grating.

FIG. 21 and FIG. 22 show a fourth embodiment. Hereinafter, portions different from the third embodiment will be described. In the present embodiment, the diffusion plate 7 and the diffraction grating 8 are each provided with antireflection films 7a, 7b, 8a, 8b. FIG. 21 and FIG. 22 show the present embodiment applied to the arrangement structures of FIGS. 19 and 20 in the third embodiment, respectively. The antireflection films 7a, 7b, 8a, and 8b are configured so as to have the smallest reflectance with respect to the wavelength of the laser light of the laser module 4.

In FIG. 21, the diffraction grating 8 provided so as to be in contact with the laser light emission surface of the laser module 4 has the antireflection film 8a provided on a laser light entrance surface and the antireflection film 8b provided on a laser light emission surface. Further, the diffusion plate 7 has the antireflection film 7a provided on a laser light entrance surface and the antireflection film 7b provided on a laser light emission surface.

In FIG. 22, similarly, the diffraction grating 8 provided at a position separated from the laser light emission surface of the laser module 4 has the antireflection film 8a provided on the laser light entrance surface and the diffraction grating 8a provided on the laser light emission surface. Further, the diffusion plate 7 has the antireflection film 7a provided on the laser light entrance surface and the antireflection film 7b provided on the laser light emission surface.

According to the fourth embodiment, in the diffusion plate 7 and the diffraction grating 8, it is possible to restrict the entered laser light or the emitted light from being reduced in the light amount by the component reflected on the entrance surface or the emission surface. As a result, it is possible to restrict a decrease in the amount of the diffused light L to the imaging area A and to use the light efficiently.

Note that the antireflection film may be provided on either the entrance surface or the emission surface. Further, a configuration in which one of the diffusion plate 7 and the diffraction grating 8 is provided with the antireflection film may also be employed. Further, the antireflection film only needs to be provided so as to cover at least an area through which the laser light passes.

Fifth Embodiment

Figure 23:
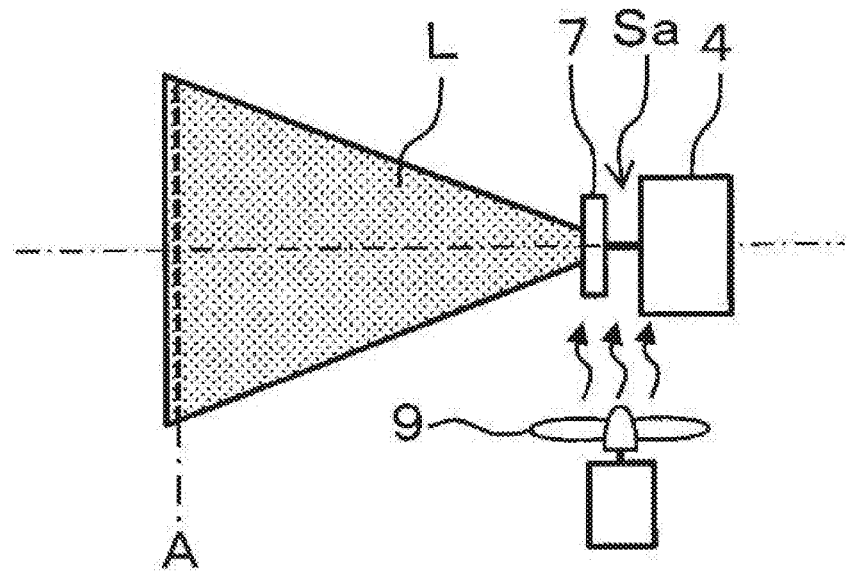
FIG. 23 is a diagram (part 1) showing an arrangement relationship between a laser module, a diffusion plate, and a diffraction grating according to a fifth embodiment.
Figure 24:
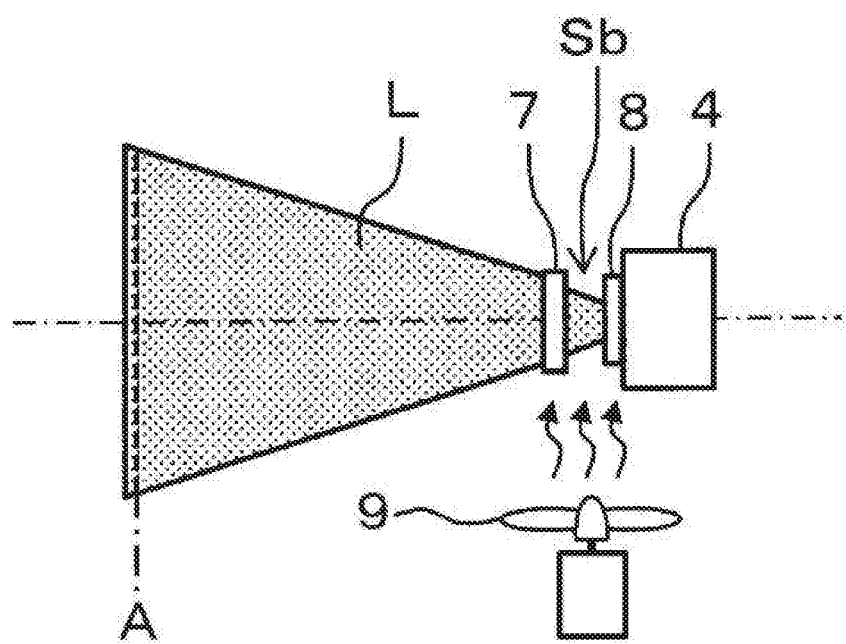
FIG. 24 is a diagram (part 2) showing an arrangement relationship between the laser module, the diffusion plate, and the diffraction grating.
Figure 25:
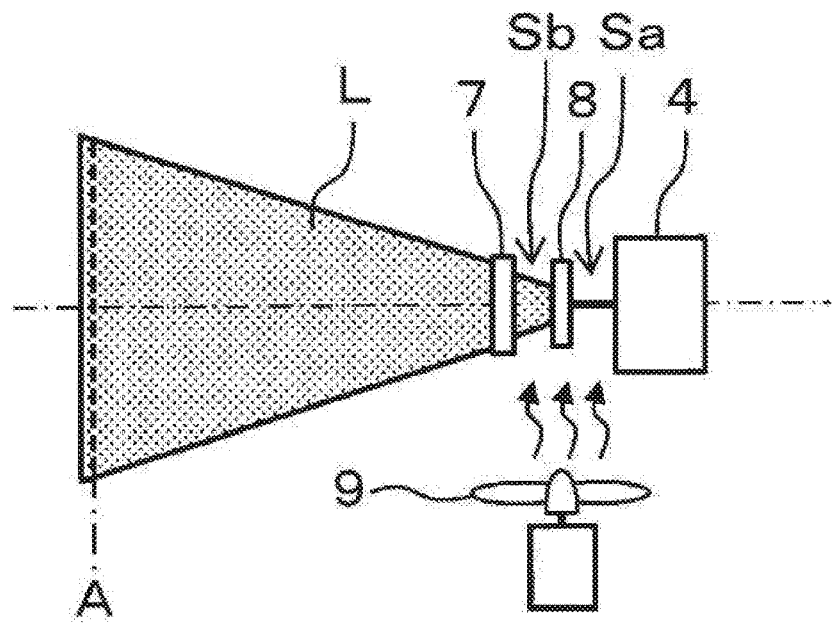
FIG. 25 is a diagram (part 3) showing an arrangement relationship between the laser module, the diffusion plate, and the diffraction grating.

FIG. 23 to FIG. 25 show a fifth embodiment. Hereinafter, portions different from the first embodiment or the fourth embodiment will be described. In the present embodiment, a cooling fan 9 is provided as a heat radiator for radiating heat transmitted from the laser module 4 to the optical member.

In FIG. 23, the diffuser plate 7 in the first embodiment is disposed at a position separated from the laser light emission surface of the laser module 4 with a space portion Sa therebetween. The cooling fan 9 is disposed so as to blow air toward the laser module 4, the diffusion plate 7, and the space portion Sa. As a result, the heat generated in the laser module 4 is cooled by the cooling fan 9 in the space portion Sa, so that the heat is less likely to be transmitted to the diffusion plate 7 and increase in the temperature is restricted. Further, the heat radiation characteristic of the laser module 4 is also improved.

In FIG. 24, the diffraction grating 8 according to the fourth embodiment is disposed so as to be in contact with the laser light emission surface of the laser module 4, and the diffusion plate 7 is disposed at a position separated from the diffraction structure 8 with a space portion Sb therebetween. The cooling fan 9 is disposed so as to blow air toward the laser module 4, the diffusion plate 7, the diffraction grating 8, and the space portion Sb.

Accordingly, the heat generated in the laser module 4 is cooled by the cooling fan 9 at a position where the heat is emitted to the space portion Sb via the diffraction grating 8, so that the heat is less likely to be transmitted to the diffusion plate 7 and the increase in the temperature is restricted. Further, the heat radiation characteristics of the laser module 4 and the diffraction grating 8 are also improved.

In FIG. 25, the diffraction grating 8 in the fourth embodiment is disposed at a position separated from the laser light emission surface of the laser module 4 with the space portion Sa therebetween, and the diffusion plate 7 is disposed at a position separated from the diffraction structure 8 with the space portion Sb therebetween. The cooling fan 9 is disposed so as to blow air toward the laser module 4, the diffusion plate 7, the diffraction grating 8, and the space portion Sb.

Accordingly, when the heat generated in the laser module 4 is released to the space portion Sa, the cooling fan 9 cools the heat, and the diffraction grating 8 is in a state where the heat is less likely to be transmitted and the increase in the temperature is restricted. The diffraction grating 8 is cooled by air from the cooling fan 9 in the spaces Sa and Sb on both sides, and the diffusion plate 7 is also cooled by air from the cooling fan 9. Accordingly, the heat radiation characteristics of the laser module 4, the diffraction grating 8, and the diffusion plate 7 are also improved.

According to the fifth embodiment, the cooling fan 9 is provided as the heat radiator, and the laser module 4, the diffusion plate 7, and the diffraction grating 8 are cooled via the space portions Sa and Sb. Thus, the transmission of heat from the laser module 4 to the diffraction grating 8 and the diffusion plate 7 can be restricted.

Sixth Embodiment

Figure 26:
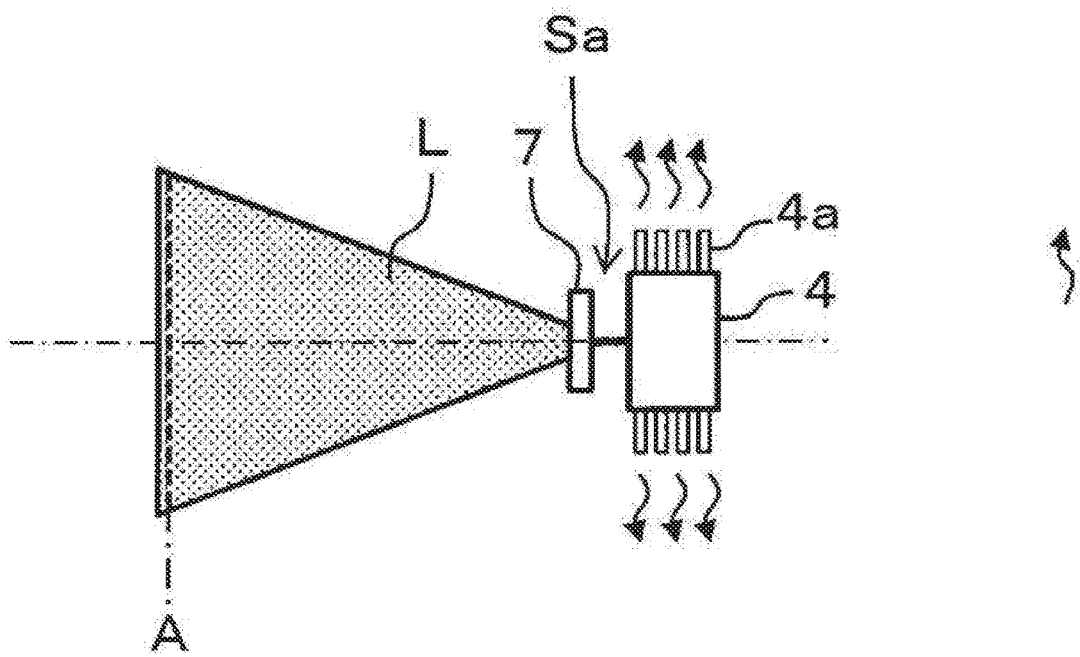
FIG. 26 is a diagram (part 1) showing an arrangement relationship between a laser module, a diffusion plate, and a diffraction grating according to a sixth embodiment.
Figure 27:
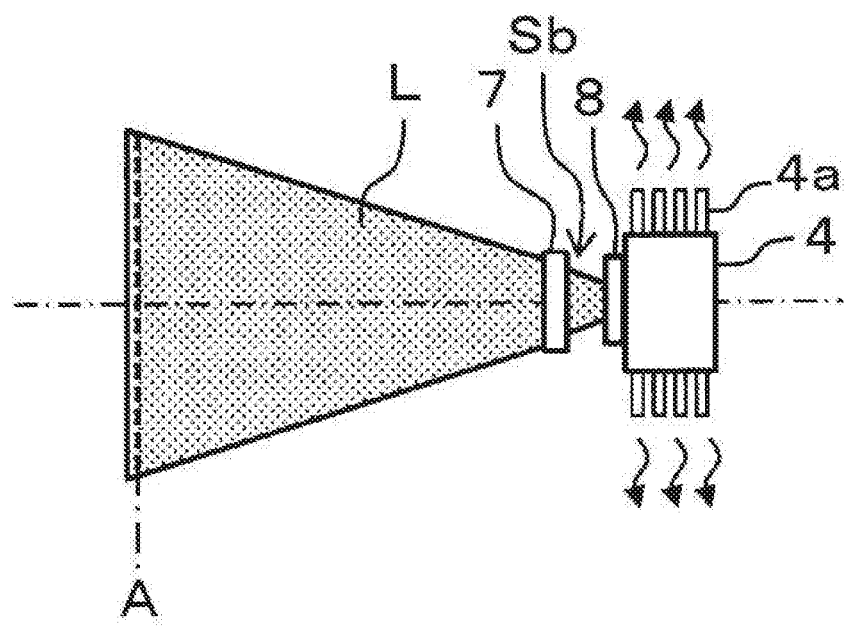
FIG. 27 is a diagram (part 2) showing an arrangement relationship between the laser module, the diffusion plate, and the diffraction grating.
Figure 28:
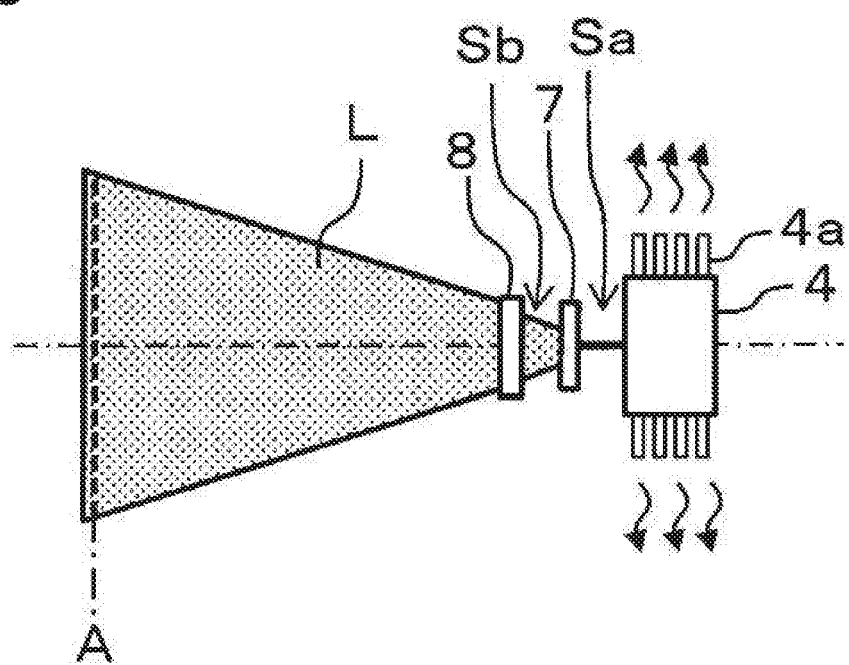
FIG. 28 is a diagram (part 3) showing an arrangement relationship between the laser module, the diffusion plate, and the diffraction grating.

FIG. 26 to FIG. 28 show the sixth embodiment. Hereinafter, portions different from the fifth embodiment will be described. In the present embodiment, the laser module 4 is provided with a radiation fin 4*a* as a heat radiator instead of the cooling fan 9.

FIG. 26 to FIG. 28 respectively show configurations corresponding to the configurations of FIG. 23 to FIG. 25 shown in the fifth embodiment. In any of the configurations, the radiation fin 4*a* is provided in the laser module 4 instead of the cooling fan 9. Accordingly, the heat generated from the laser module 4 is released into the air via the radiation fin 4*a*, and the heat component transmitted to the diffusion plate 7 and the diffractive structure 8 can be greatly reduced. Therefore, according to the sixth embodiment, substantially the same effects as those of the fifth embodiment can be obtained.

Note that the fifth embodiment and the sixth embodiment may be combined. Further, in the fifth embodiment or the sixth embodiment, the antireflection film shown in the fourth embodiment may be provided.

Other Embodiments

The present disclosure should not be limited to the embodiments described above. Various embodiments may further be implemented without departing from the scope of the present disclosure, and may be modified or expanded as described below.

Each of the above-described embodiments shows an example in which the present disclosure is applied to the state detection device 1 that detects the state of the driver. However, the present disclosure is not limited to this, and can be applied to a device for capturing an image of a vehicle interior such as a drive recorder. Each of the above-described embodiments can be implemented as a combination of the respective effects by combining the respective embodiments.

Although the present disclosure has been made in accordance with the embodiments, it is understood that the present disclosure is not limited to such embodiments and structures. The present disclosure covers various modification examples and equivalent arrangements. In addition, various combinations and configurations, as well as other combinations and configurations that include only one element, more, or less, are within the scope and spirit of the present disclosure.

What is claimed is:

1. A state detection device comprising:
   a camera configured to capture an image of an imaging area where a driver is present;
   a laser configured to emit light toward the imaging area; and
   an optical member configured to emit the light of the laser with spreading to a predetermined irradiation area, wherein
   the optical member is further configured to control a light distribution of the light of the laser in such a manner that an irradiation intensity of the light of the laser increases with a distance from the irradiation area of the light of the laser to the camera.

2. The state detection device according to claim 1, wherein
   the optical member has a function for diffusing the light of the laser.

3. The state detection device according to claim 1, wherein
   the optical member is formed into a plate shape or a film shape.

4. The state detection device according to claim 1, wherein
   the irradiation area irradiated with the light of the laser is coincident with the imaging area of the camera.

5. The state detection device according to claim 1, wherein
   the optical member is further configured to diffuse the light of the laser by a diffraction grating.

6. The state detection device according to claim 1, wherein
   the optical member is one of a plurality of optical members provided on an irradiation path of the light of the laser.

7. The state detection device according to claim 6, wherein
   the plurality of optical members include a diffraction grating and a diffusion plate or a film that has a function of diffusing the light of the laser.

8. The state detection device according to claim 7, wherein
   in the plurality of optical members, the diffraction grating is disposed between the laser and the diffusion plate or the film.

9. The state detection device according to claim 5, wherein
   the diffusion plate or the film configuring the optical member is set so that a scattering coefficient with respect to the light of the laser differs between a center position from which the light of the laser is emitted and a surrounding area.

10. The state detection device according to claim 7, wherein
    the optical member is provided with an antireflection film at least at a portion where the light of the laser passes.

11. The state detection device according to claim 1, further comprising
    a heat radiator configured to release a heat transmitted from the laser toward the optical member.

12. The state detection device according to claim 1, further comprising
    an air layer disposed between the laser and the optical member, or between a plurality of optical members in a case where the plurality of optical members is provided, so as to reduce the heat transmitted from the laser toward the optical member.

13. The state detection device according to claim 1, further comprising
a controller that intermittently turns on the laser and controls the camera to capture the image during a turn-on period of the laser.

14. The state detection device according to claim 1, further comprising:
a distance detector configured to detect a distance from the laser to the driver in the irradiation area; and
a controller configured to perform a dimming control to weaken the light of the laser when the distance detected by the distance detector is equal to or less than a predetermined distance.

15. The state detection device according to claim 1, further comprising:
a temperature detector configured to detect a temperature of the laser; and
a controller configured to reduce the light of the laser or intermittently turn on the laser when the temperature detected by the temperature detector is equal to or higher than a predetermined temperature.

16. A state detection device comprising:
a camera configured to capture an image of an imaging area where a driver is present;
a laser configured to emit light toward the imaging area; and
an optical member configured to emit the light of the laser with spreading to a predetermined irradiation area, wherein
the optical member is further configured to
control a light distribution of the light of the laser, and
diffuse the light of the laser by a diffraction grating.

17. A state detection device comprising:
a camera configured to capture an image of an imaging area where a driver is present;
a laser configured to emit light toward the imaging area; and
an optical member configured to emit the light of the laser with spreading to a predetermined irradiation area, wherein
the optical member is further configured to control a light distribution of the light of the laser, and
the optical member is one of a plurality of optical members provided on an irradiation path of the light of the laser.

* * * * *